W. C. SMITH.
Seed-Planter.
No. 203,951. Patented May 21, 1878.
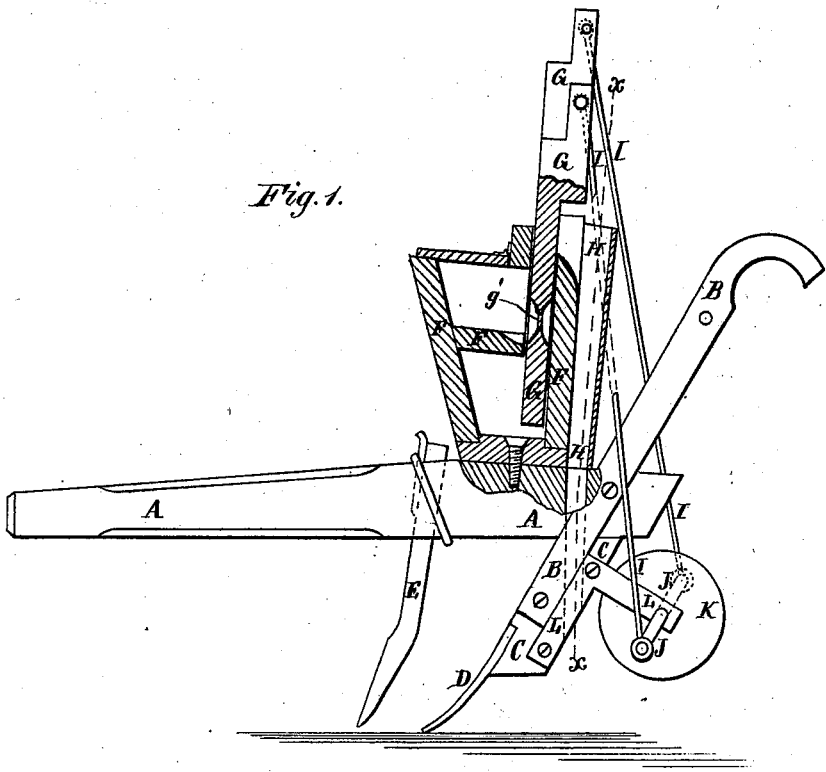
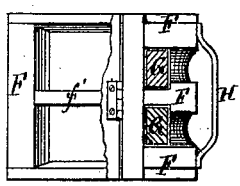
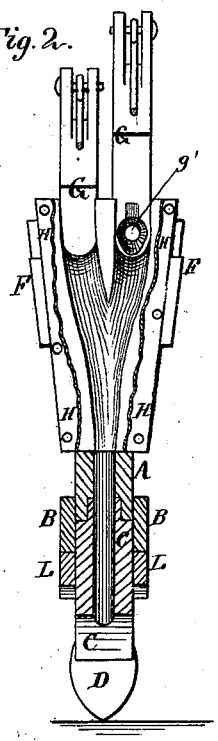
WITNESSES:
Henry N. Miller
C. Sedgwick
INVENTOR:
W. C. Smith
BY Munn & Co.
ATTORNEYS.

UNITED STATES PATENT OFFICE.

WILLIAM CARROLL SMITH, OF JACKSON, TENNESSEE.

IMPROVEMENT IN SEED-PLANTERS.

Specification forming part of Letters Patent No. 203,951, dated May 21, 1878; application filed February 28, 1878.

*To all whom it may concern:*

Be it known that I, WILLIAM C. SMITH, of Jackson, in the county of Madison and State of Tennessee, have invented a new and useful Improvement in Seed-Planters, of which the following is a specification:

Figure 1 is a side view of my improved planter, part being broken away to show the construction. Fig. 2 is a cross-section of the same, taken through the line $x\ x$, Fig. 1. Fig. 3 is a top view of the same, parts being broken away to show the construction. Fig. 4 is a detail view of one of the dropping-slides.

Similar letters of reference indicate corresponding parts.

The object of this invention is to furnish an improved seed-planter which shall be simple in construction, convenient in use, and effective in operation, which may be applied to an ordinary plow-stock, and which may be used for planting corn and pease in alternate hills, or either separately, and may also be used for planting other seeds.

A represents the beam, B the handles, C the standard, D the plow-plate, and E the colter, of an ordinary shovel-plow, about the construction of which parts there is nothing new.

F is the hopper, the front and rear sides of which are extended downward, and are attached to a board, by means of which the said hopper is secured to the beam A directly over the plow-plate D. The hopper F is divided into two compartments by a vertical partition, $f'$, which may be made detachable.

Along the inner surface of the rear side of the hopper F work two upright sliding bars, G, which pass through holes in the bottom of the said hopper, and which have holes $g'$ formed through them, of such a size as to allow the seed to pass through them. The holes $g'$ are countersunk upon both sides of the slides G, as shown in Fig. 1, the forward countersink being intended to facilitate the passage of the seed, and the rear countersink being intended to form a recess between the slides and the rear side of the hopper, to receive enough seed to be dropped at a time.

The rear side of the hopper F is notched from its upper edge, and the bottoms of the said notches are concaved and beveled, so that the seed will pass out freely as soon as the holes in the slides G rise above the bottoms of the said notches.

To the outer surface of the rear side of the hopper F is attached a spout, H, which is made wide in its upper part, to receive seed from both the dropping-slides G. The lower part of the spout H is made narrow, and is connected with or passes through a hole leading down through the beam A and the standard C, to conduct the seed into the furrow close in the rear of the plow-plate D.

To the upper ends of the dropping-slides G are pivoted the upper ends of the connecting-rods I, the lower ends of which are pivoted to the cranks J, formed upon or attached to the ends of the journals of the wheel K. The cranks J project in opposite directions, so that the dropping-slides G may always move in opposite directions, and may thus drop the seed alternately.

The journals of the wheel K revolve in bearings in brackets or arms L, attached to the standard C in such positions that the face of the said wheel K may come in contact with the ground, and may be revolved by said contact.

In using the machine, one kind of seed may be put in one compartment of the hopper F and another kind put in the other compartment, and the two kinds dropped alternately; or the same kind of seed may be put into both compartments; or seed may be put into one compartment, the dropping-slide of the other compartment being allowed to run empty or being detached; or the partition may be removed and one or both the dropping-slides used.

A coverer may be applied to the machine, to cover the seed as it is dropped, if desired.

It will be observed that I have an elongated double-countersunk hole, with a sharp keen-edged seam in the middle, said seam separating the seed in the back cavity from those in the box when it ascends to the outlet, the surplus dropping back into the box, and the seed having no obstruction in its passage from the box to the outlet. Hence

What I claim is—

The combination, in a seeder, with the hopper F, of the slides G, having opposite countersunk holes on both sides, arranged as and for the purpose specified.

WILLIAM CARROLL SMITH.

Witnesses:
  H. F. SMITH,
  G. C. ANDERSON.